Sept. 19, 1933.  W. FREUND  1,927,364
PACKAGING DEVICE FOR BREAD AND LIKE LOAVES
Filed Nov. 25, 1929  2 Sheets-Sheet 1
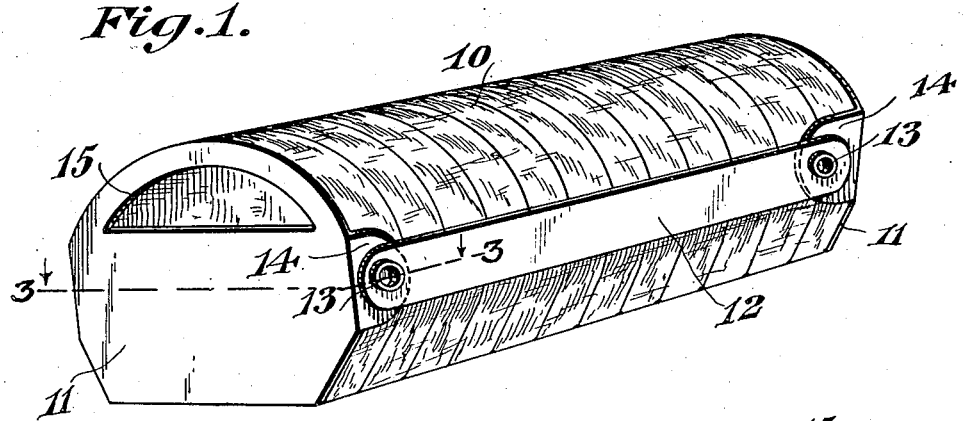
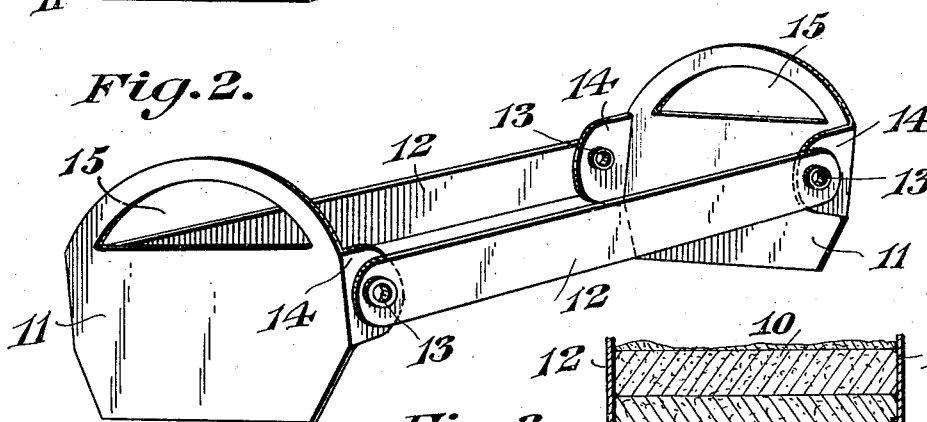
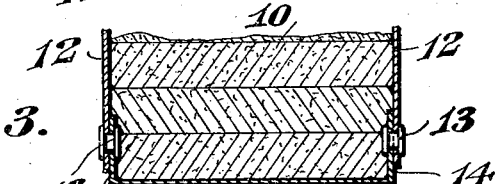
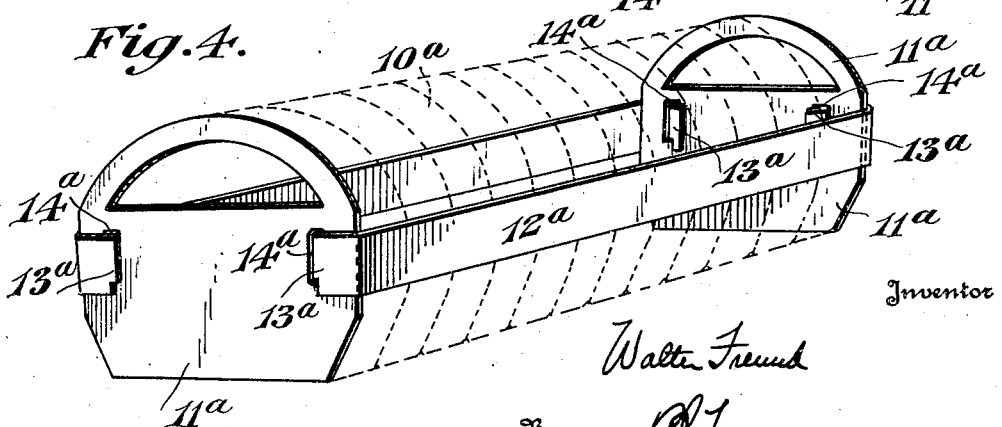

Sept. 19, 1933.  W. FREUND  1,927,364
PACKAGING DEVICE FOR BREAD AND LIKE LOAVES
Filed Nov. 25, 1929   2 Sheets-Sheet 2
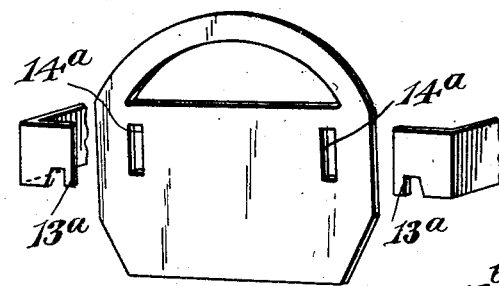
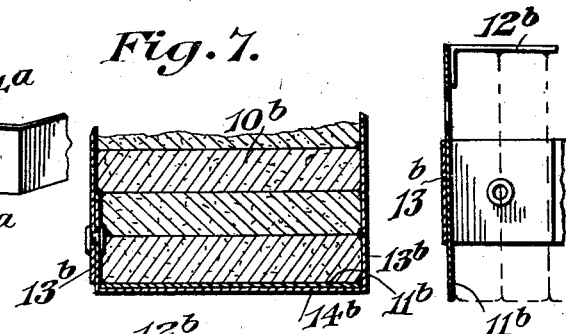
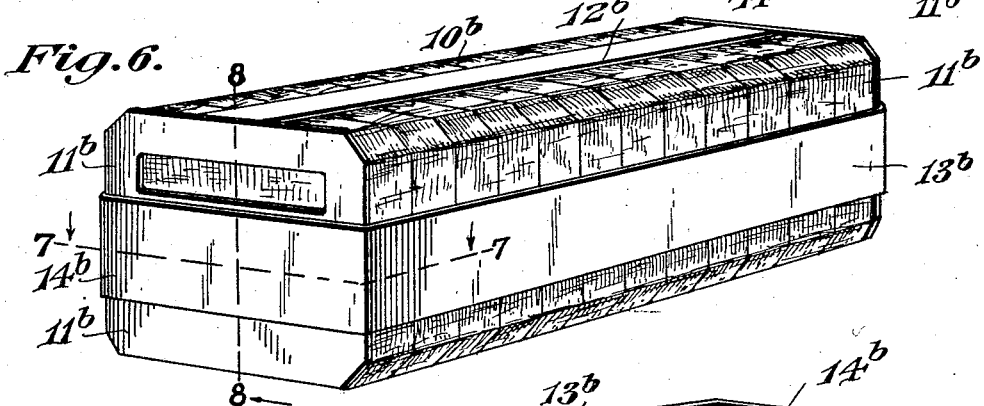
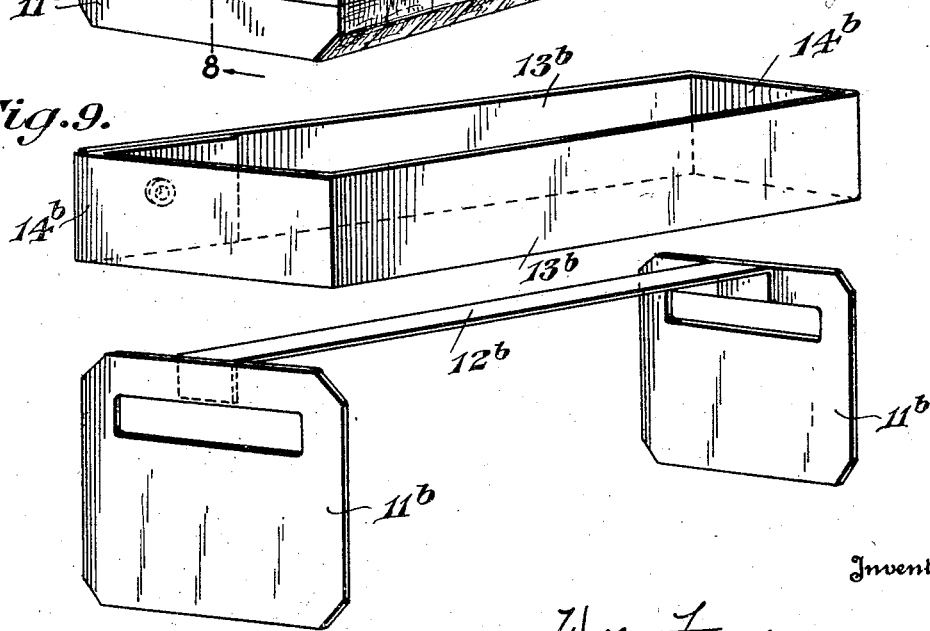
Inventor
Walter Freund
By
Attorney Patented Sept. 19, 1933

1,927,364

UNITED STATES PATENT OFFICE 1,927,364

PACKAGING DEVICE FOR BREAD AND LIKE LOAVES

Walter Freund, St. Louis, Mo.

Application November 25, 1929
Serial No. 409,637

6 Claims. (Cl. 24—17)

This invention relates to a new and useful improvement in means for packaging bread and the like for the sanitary, convenient and attractive delivery to the consumer.

Heretofore bread and the products of commercial baking in general have usually been wrapped for delivery in moisture-proof packages. It has also been the custom to assemble articles, such as doughnuts, zwieback, rusks, drop-cakes, crackers, crullers, sliced bread and many others by enclosing them in suitable paper or the like, or supporting them in paper trays prior to wrapping. This latter practice has certain objectionable features, but more particularly in the case of bread, since the bottom surface of bread initially contains and subsequently accumulates large amounts of fats which readily diffuse throughout the tray, and not only contaminate, but also thus create an ideal physical condition to rapidly become rancid.

In the packaging of bread, either whole or sliced, the wrapping tissue invariably used, is very thin and while excellently adapted for the purpose of excluding air and retaining moisture, it is incapable, owing to its total lack of stiffness, to function correctly to the contour of the bread without a more suitable support than has heretofore been furnished by the loaf alone.

The production of an even, fairly uniform loaf of bread from day to day, or even within one day, is beyond the present possibilities of the art or craft. In consequence commercial bread as now marketed, is lacking in uniformity of package, essential for the purpose of correctly assembling a number of finished loaves into shipping containers or into the trays customarily used in delivery wagons. It is also lacking in attractiveness, since the wrapping machine must be adjusted for a general averaged type of loaf and has no compensating mechanism for variations of size within the given type for which it is adjusted. As a consequence the wrapper frequently becomes crinkled, ill-shaped and often is not properly sealed.

One of the objects of the present invention is to provide a means of a novel, simple and effective character for maintaining a loaf, such as bread, in a predetermined size and shape, said means being such that a relatively small amount of contact occurs between it and the loaf, and the bottom of the loaf, which contains the accumulation of greases and the like, is preferably left untouched, so that an unsanitary, unsatisfactory and ill-appearing package or container is not present, while the loaf is braced and supported by the clamping means, which in turn is itself supported by the loaf.

A still further and important object is to provide a holding or clamping means, particularly desirable for sliced or sectioned loaves and the like, in which the slices or sections or members are held in frictional contact with one another sufficiently to maintain the desired assemblage for handling and transportation and yet from which the slices, sections or members can be readily withdrawn.

Several embodiments of the invention are disclosed in the accompanying drawings, wherein:

Figure 1 is a perspective view of one embodiment of the invention.

Figure 2 is a perspective view of the clamp detached from the loaf.

Figure 3 is a sectional view substantially on the line 3—3 of Figure 1.

Figure 4 is a detail perspective view of a slightly modified form of construction.

Figure 5 is a detail view of the clamping and tie members of Figure 4 in detached relation.

Figure 6 is a perspective view of another embodiment of the invention.

Figure 7 is a sectional view on the line 7—7 of Figure 6.

Figure 8 is a sectional view on the line 8—8 of Figure 6.

Figure 9 is a perspective view of the clamp of Figure 6 with the members thereof separated.

Considering the embodiment disclosed in Figures 1, 2 and 3, the usual sliced loaf of bread is shown at 10, it being understood that the slices are separate and separable, but that the loaf is held in this in its assembled form. The loaf is held in this assembled condition by a clamp, which in the present form, consists of end walls 11 corresponding in contour and size generally to the end faces of the loaf. These end walls are connected by tie strips 12 which are pivoted, as shown at 13 to the end walls, preferably by eyelets or the like engaged with ears 14 formed on the opposite sides of the end walls 11. The type of pivotal connection is, however, relatively immaterial.

The length of the tie strips 12 is such that the space between the end walls 11 is just sufficient to snugly receive the loaf 10 and consequently said loaf is clamped by and between the end walls, the compression being sufficient to effectively hold the slices in frictional contact, so that they will remain in position. More than that, it will be noted that because of the pivotal connections between the tie strips and the end walls, the end walls can assume the same angular relation as the end surfaces of the loaf and a certain amount of wedging action is obtained.

It will be obvious that with this structure there is relatively little contact between the holder or clamp and the loaf, and said clamp is bottomless so that the bottom of the loaf has no engagement with any portion of the holder or cradle. The amount of contact moreover may be lessened by providing openings, as 15 in the end walls, which further serve to form handle means for the structure.

As a consequence of this structure, it is not only unnecessary to impale or perforate the loaf, but the use of a tray is dispensed with and consequently the discoloration and unsanitary conditions due to the accumulation of grease in the tray is obviated. Moreover as the clamp may be made ornamental, a very attractive package can be produced.

In the form of construction shown in Figures 4 and 5, exactly the same effect as above described is secured by slightly different means. The sliced loaf is designated therein 10a, the end walls 11a and the tie strips 12a. In this embodiment the connection between the tie strips and the end walls is secured by having the ends of the tie strips in the form of hooks 13a that engage in openings 14a formed in the side margins of the end walls, the connections having sufficient play to permit the end walls to turn and accommodate themselves to any inclination of the end surfaces of the loaf. In this structure also the distance between the end walls 11a is defined by the length of the tie strips 12a and this length is made such that a loaf of minimum size will fit snugly therein, while any slightly larger loaf may be forced to seating position.

In the form of structure shown in Figures 6-9 inclusive, the sectional loaf is shown at 10b, the end walls 11b which in this case are connected by a top strip 12b. A keeper loop is employed which includes side tie strips 13b connected by end portions 14b.

In using this form of device, the end walls 11b are placed at the ends of the loaf and the strip 12b rests upon the top of the same. The keeper loop 13b—14b is then forced to place so that the end portions 14b overlie the end walls 11b. The tie strips 13b extend on opposite sides of the loaf and tie the end walls 11b snugly against the end faces of the loaf, thereby securing the same clamping effect as that already explained and with the same advantages arising therefrom.

With this structure therefore, unsanitary, unsatisfactory and unsightly trays are dispensed with. The loaf is exposed on all sides to view and the clamping means at the same time effectively secures and maintains the loaf in assembled condition. However, a slice can be removed easily by grasping it and withdrawing it from the others through the open bottom or top and if the loaf is then laid on its side, the remaining slices will remain as before until withdrawn.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A device for clamping a loaf comprising a bottomless tapered crate that conforms to the taper of the loaf to be contained therein, and comprising end walls for engaging the ends of the loaf and side walls narrower than the end walls.

2. A device for confining a loaf comprising end clamp members for engagement with the opposite ends of the loaf, and tie straps narrower than the end clamp members that extend along opposite sides of the loaf and are engaged with the end clamp members, said tie straps being of a length to cause the end clamp members to clamp firmly against the ends of the loaf to frictionally support and be supported by the loaf.

3. A device for confining a loaf comprising a bottomless crate having end walls for engagement with the ends of the loaf, and side strips narrower than the end walls and that serve to tie together the end walls between their top and bottom edges and clamp them against the ends of the loaf with sufficient firmness to prevent the loaf sliding therefrom through the open bottom.

4. A device for confining a loaf, comprising a crate having end walls for engagement with the ends of the loaf and having side ears, and side strips narrower than the end walls and having pivotal engagement with the ears to permit the end walls to assume angular relations to conform to the end surfaces of the loaf.

5. A device for confining a loaf, comprising a bottomless crate having end walls for clamping against the ends of a loaf and provided with offset side ears, side strips to which the side ears of the end walls are pivoted said side strips being of a length to cause the loaf to be clamped by and between the end walls with sufficient force to hold the slices from slipping through the open bottom.

6. A packaging device for a loaf of bread comprising downwardly convergent end walls that are adapted to lie against the correspondingly disposed ends of the loaf, and tie strips connecting the side margins of the end walls between their upper and lower ends and spacing apart said end walls the length of the said loaf, the said tie strips being adapted to extend along the opposite sides of the loaf, the structure being open at the bottom.

WALTER FREUND.